Patented Mar. 7, 1950

2,499,628

UNITED STATES PATENT OFFICE 2,499,628

PROCESS FOR PREPARING 2-MERCAPTO-5-CHLOROBENZOTHIAZOLE

Lester A. Brooks, Norwalk, Conn., assignor to R. T. Vanderbilt Co., Inc., New York, N. Y., a corporation of New York No Drawing. Application April 23, 1947, Serial No. 743,449

2 Claims. (Cl. 260—306)

My invention concerns an improved method for preparing 2-mercapto-5-chlorobenzothiazole:

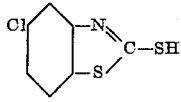

This compound is useful, for example, as an intermediate in the synthesis of a number of other organic compounds.

In the conventional method of preparing the compound, 2,5-dichloronitrobenzene is reacted at an elevated temperature of the order of 100° C.–110° C., in the presence of water as solvent, with hydrogen sulfide, carbon disulfide and sodium hydrogen sulfide. Although the reaction generally gives fairly high yields, it is impractical in a commercial sense because of the time required to consummate it. Most of the time is consumed during the early and intermediate stages of the reaction when the reaction mixture cannot be heated too strongly without risking its getting out of hand.

It is my opinion that the tendency of the reaction to become violent derives from or, at least, is associated with the reduction of a part of the dichloronitrobenzene and hydrogen sulfide and the combining of the resulting elemental sulfur in a sodium perthiocarbonate which may conform to the formula

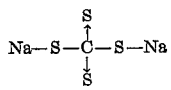

In any event, I have found that by adding elemental sulfur to the reaction mixture, full heat may be applied from the beginning and the reaction time thereby greatly shortened.

The amount of sulfur added may vary within fairly wide limits, even a very small amount enabling consummation of the reaction in less time than heretofore. Generally, however, I prefer to add the sulfur in an amount equivalent to from one-sixth to one-third of the total weight of the dichloronitrobenzene employed. If indicated, increments of sulfur may be added as the reaction proceeds, but I have not found this necessary.

The detailed practice of my invention is illustrated by the following example:

In a 3-liter, 3-necked flask fitted with a stirrer, a reflux condenser and an inlet tube reaching to the bottom of the flask is placed 430–450 g. of a 60% aqueous solution of sodium sulfide, 1500 c. c. of hot water, 75 g. of sulfur and 100 c. c. of carbon bisulfide. Hydrogen sulfide is bubbled through a flask containing carbon bisulfide maintained at a temperature near its boiling point by means of a water bath and the resulting carbon sulfide-hydrogen sulfide mixture passed into the reaction flask through the inlet tube. While maintaining the gas flow, the flask is heated to about 105° C. The solution becomes a deep red. The gas is shut off momentarily while 50 to 75 g. of 2,5-dichloronitrobenzene is added. Thereafter, the mixture is kept at about 100–110° C. while maintaining a rapid rate of hydrogen sulfide-carbon disulfide flow, a total of 300 g. of dichloronitrobenzene being added over a one and one-half hour period. At the end of 2 hours, the gas is shut off and the reaction mixture poured into about 10 liters of cold water. A slight precipitation of 2-mercapto-5-chlorobenzothiazole may occur upon this dilution but the addition of a few c. c.'s of ammonium hydroxide will serve to bring the material back into solution. Upon standing overnight a small amount of a by-product, essentially dichloroaniline, separates out. This is filtered off. To the clear red colored filtrate there is added sufficient dilute sulfuric acid to completely precipitate the 2-mercapto-5-chlorobenzothiazole and sulfur. This combined precipitate is filtered off and treated with about 10 liters of warm dilute ammonium hydroxide to dissolve all the 2-mercapto-5-chlorobenzothiazole. The undissolved sulfur is then removed by filtration and the 2-mercapto-5-chlorobenzothiazole precipitated from the filtrate using dilute acid. Upon the addition of sufficient benzene to the filtrate, the precipitated thiazole forms as a paste on the surface and is separated from the tremendous volume of water it normally occludes. Filtration and a short drying period gives 265 g. (84.2% yield) of a product having a melting point of 201–202° C.

I claim:

1. In the preparation of 2-mercapto-5-chlorobenzothiazole, by reacting 2,5-dichloronitrobenzene with hydrogen sulfide, carbon disulfide and sodium hydrogen sulfide in the presence of water, the improvement which consists in adding elemental sulfur to the reaction mixture.

2. In the preparation of 2-mercapto-5-chlorobenzothiazole, by reacting 2,5-dichloronitrobenzene with hydrogen sulfide, carbon disulfide and sodium hydrogen sulfide in the presence of water, the improvement which consists in initially including in the reaction mixture an amount of elemental sulfur equivalent to from $\frac{1}{6}$ to $\frac{1}{3}$ of the total weight of the 2,5-dichloronitrobenzene employed.

LESTER A. BROOKS.

REFERENCES CITED

The following references are of record in the file of this patent:

UNITED STATES PATENTS

| Number | Name | Date |
|---|---|---|
| 1,637,791 | Teppema | Aug. 2, 1927 |
| 1,785,656 | Sebrell et al. | Dec. 16, 1930 |
| 1,960,205 | Dunbrook | May 22, 1934 |

OTHER REFERENCES

Schlesinger, "General Chemistry" (1931), Green & Co., publisher, p. 311.